(12) United States Patent
Freitag et al.

(10) Patent No.: US 6,904,695 B2
(45) Date of Patent: Jun. 14, 2005

(54) POSITION MEASURING SYSTEM AND METHOD FOR THE ASSEMBLY THEREOF

(75) Inventors: Hans-Joachim Freitag, Jena (DE); Heinz-Guenther Franz, Hamburg (DE); Andreas Schmidt, Erfurt (DE)

(73) Assignee: Optolab Licensing GmbH, Hamburg (DE)

( * ) Notice: Subject to any disclaimer, the term of this patent is extended or adjusted under 35 U.S.C. 154(b) by 0 days.

(21) Appl. No.: 10/416,911

(22) PCT Filed: Nov. 9, 2001

(86) PCT No.: PCT/EP01/12993

§ 371 (c)(1),
(2), (4) Date: Sep. 30, 2003

(87) PCT Pub. No.: WO02/40947

PCT Pub. Date: May 23, 2002

(65) Prior Publication Data

US 2004/0045182 A1 Mar. 11, 2004

(30) Foreign Application Priority Data

Nov. 17, 2000 (DE) .......................................... 100 56 947

(51) Int. Cl.⁷ ......................... G01D 11/16; G01D 18/00
(52) U.S. Cl. ........................................... 33/706; 33/645
(58) Field of Search .......................... 33/706, 707, 708, 33/613, 645, 1 PT; 29/464, 465, 467, 468, 469; 248/413, 316.1, 231.71

(56) References Cited

U.S. PATENT DOCUMENTS

| | | | | |
|---|---|---|---|---|
| 4,031,595 A | * | 6/1977 | Welker | 250/237 G |
| 4,070,759 A | * | 1/1978 | Nelle | 33/705 |
| 4,338,517 A | | 7/1982 | Perrine | 250/231.13 |
| 4,593,269 A | * | 6/1986 | Nakamura et al. | 341/13 |
| 4,639,595 A | * | 1/1987 | Okita et al. | 250/231.14 |
| 4,663,851 A | * | 5/1987 | Feichtinger | 33/1 PT |
| 4,663,853 A | * | 5/1987 | Indo et al. | 33/707 |
| 4,933,636 A | | 6/1990 | McGee | 324/175 |
| 4,936,023 A | * | 6/1990 | Pechak | 33/706 |
| 5,036,597 A | * | 8/1991 | Falkinger et al. | 33/706 |
| 5,760,392 A | * | 6/1998 | Hisamoto et al. | 250/237 G |
| 5,832,616 A | * | 11/1998 | Fiedler | 33/706 |

(Continued)

FOREIGN PATENT DOCUMENTS

| | | |
|---|---|---|
| EP | 0 177 711 A2 | 4/1986 |
| EP | 0 287 758 A2 | 10/1988 |

*Primary Examiner*—R. Alexander Smith
(74) *Attorney, Agent, or Firm*—Patteson, Thuente, Skaar & Christensen, P.A.

(57) ABSTRACT

The invention relates to a position measuring system for scanning a movement between a first element and a second element which is arranged in a moveable manner in relation to the first element. Said system comprises a material measure which can be fixed to the first element and has a scale carrier, and a scanning head which can be fixed to the second element and which scans a movement of the material measure in relation to the scanning head. The inventive system comprises a mount by which means the material measure and the scanning head can be fixed to each other in a pre-determined position, the scanning head being detachably fixed to the scale carrier. In order to assembly one such position measuring system on a first element and a second element moving in relation thereto, the scanning head is fixed to the material measure in such a way that the scanning head and the material measure are mutually fixed in position. The material measure is then applied to the first element and the scanning head to the second element, the scanning head or the material measure being fixed to the respective element, filling the gap, in the position which is pre-determined by the positioned mount. The mount between the scanning head and the material measure is then detached.

19 Claims, 6 Drawing Sheets

U.S. PATENT DOCUMENTS

| | | | | |
|---|---|---|---|---|
| 6,092,296 A | * | 7/2000 | Nelle | 33/706 |
| 6,145,213 A | * | 11/2000 | Shimano et al. | 33/702 |
| 6,178,656 B1 | * | 1/2001 | Jung | 33/706 |
| 6,194,894 B1 | * | 2/2001 | Apel et al. | 324/207.25 |
| 6,349,481 B1 | * | 2/2002 | Nelle | 33/702 |
| 6,415,524 B1 | * | 7/2002 | Muller et al. | 33/706 |
| 6,442,861 B1 | * | 9/2002 | Boge et al. | 33/706 |
| 2003/0182816 A1 | * | 10/2003 | Huber et al. | 33/707 |

\* cited by examiner

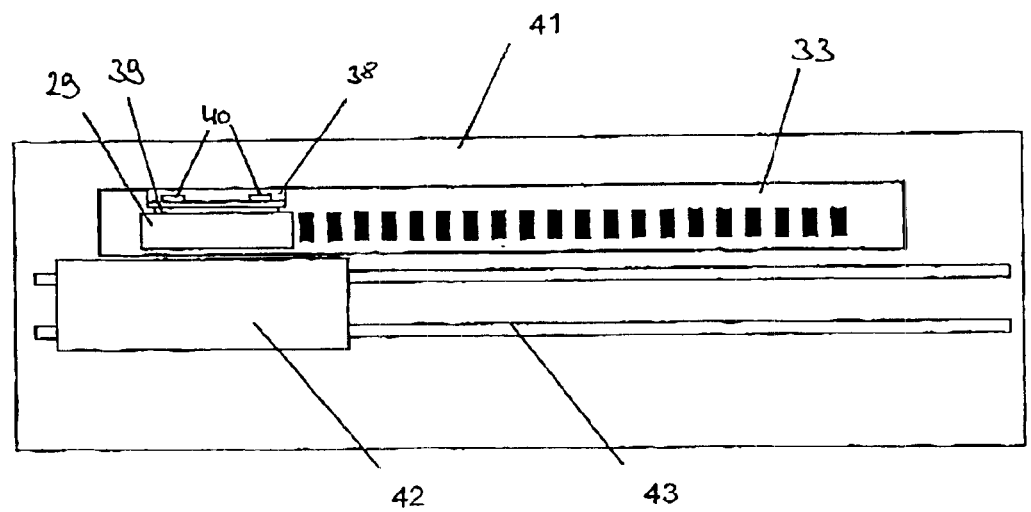
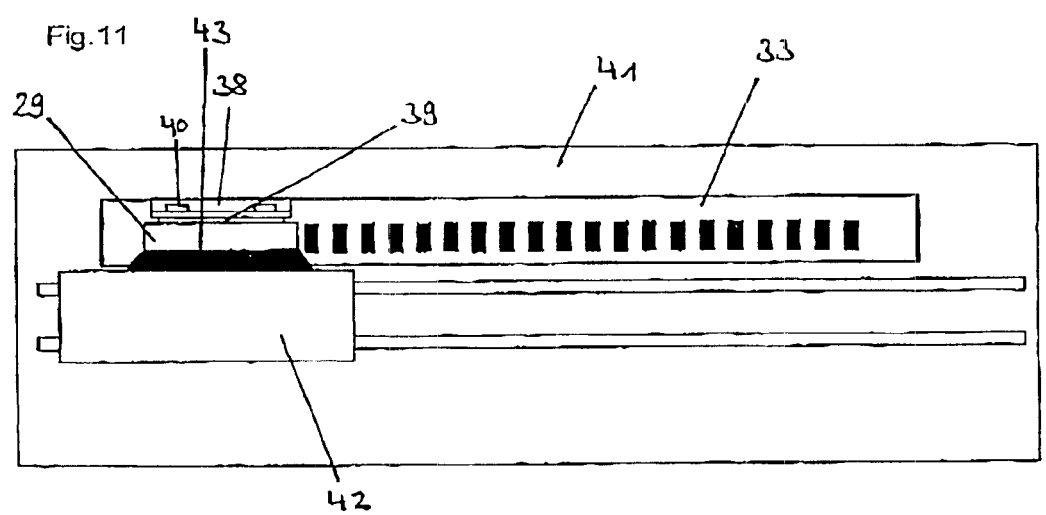
Fig. 11
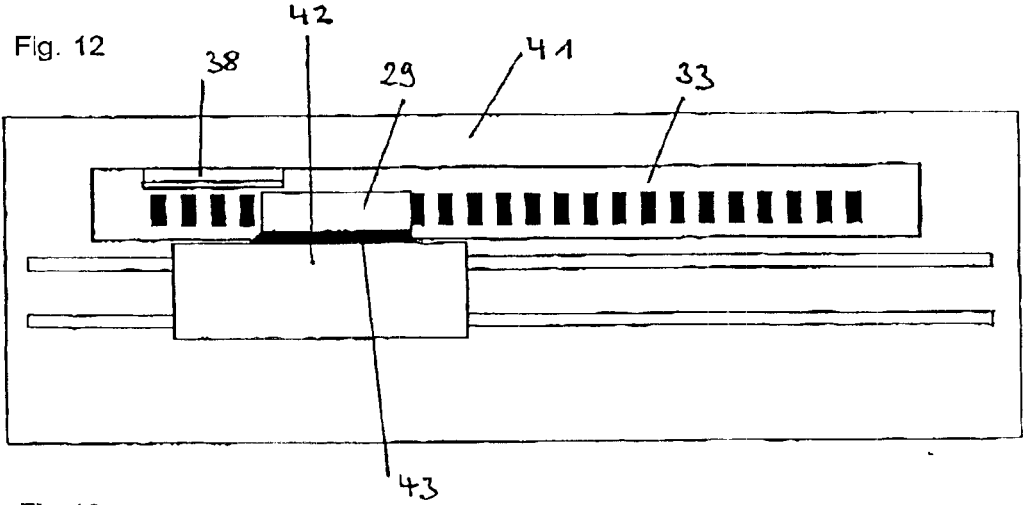
Fig. 12
Fig. 13

POSITION MEASURING SYSTEM AND METHOD FOR THE ASSEMBLY THEREOF

CROSS REFERENCE TO RELATED APPLICATIONS

This application claims priority to PCT Application designating the U.S. Ser. No. PCT/EP01/12993, filed on Nov. 9, 2001, incorporated herein by reference, which claims priority to German Application No. 100 56 947.1 filed Nov. 17, 2000, incorporated herein by reference.

BACKGROUND OF THE INVENTION

The invention relates to a method for mounting a position measuring system on a first part and on a second part movable relative to said first part, wherein said position measuring system comprises a gauge, which has a pitch carrier and is fixable on said first part, and a sensing head fixable on said second part, said method comprising the steps of fixing the sensing head on the gauge such that the sensing head and the gauge are fixed in position relative to each other, fixing the gauge on the first part and the sensing head on the second part, and releasing said fixation between the sensing head and the gauge. The invention further relates to a position measuring system for sensing a movement between a first part and a second part, which is movable relative to the first part, wherein the position measuring system comprises a gauge, which is fixable on the first part, and a pitch carrier, a sensing head, which is fixable on the second part and senses a movement of the gauge relative to the sensing head, and a fixation by which said gauge and said sensing head can be fixed in a predetermined position relative to each other.

Such devices are needed to measure the rotational position or the linear displacement of two objects which are movable relative to each other. The gauge moving relative to the sensing unit is sensed using a sensing unit, and the sensed information is transformed into position information by means of an evaluating unit. In doing so, the most diverse physical sensing principles are applied. Preferred principles are photoelectric, magnetic, inductive or capacitative sensing methods. However, as a basic principle, all methods have in common that the sensing head has to be positioned within predetermined, narrow tolerances of position and angle over the entire range of measurement, depending on the resolution and precision to be achieved.

A pre-mounted angle-measuring device without its own support is known from U.S. Pat. No. 4,639,595. The pitch carrier with its pitch is fixed on and adjusted on a hub as a gauge. In the pre-mounted state, a clamping spring holds the sensing device and the hub together. A fixed stop is provided on the hub, said fixed stop contacting the sensing device during pre-assembly and fixing the hub in the axial and radial directions. In this condition, the angle-measuring device is slid onto the driving shaft, and the sensing device is fixed on the mounting surface of the drive unit. The clamping spring is then released from its engagement, and the hub is axially displaced on the driving shaft. Said displacement is required in order to undo the contact of the stop of the hub and the sensing unit and to ensure frictionless relative movement between the hub and the sensing device.

Although this angle-measuring device, in a pre-assembled state, allows a defined alignment between the contacting surfaces of the hub and of the sensing device in the radial and axial directions, said alignment must be undone during assembly by axially displacing the hub, so that no defined alignment, neither in the radial nor in the axial directions, can subsequently be achieved without further auxiliary means. A further great deficiency of this arrangement consists in that the sensing device is preadjusted only relative to a stop on the hub, but the actual functional alignment is required directly between the sensing unit and the sensing structures on the pitch carrier. In many applications, the use of an additional hub or of other intermediate parts for assembly of the gauge is not possible. These intermediate parts deteriorate the precision of adjustments by considerable cumulative tolerances and, in many cases, also lead to expensive solutions.

Another solution concerning the assembly of preadjusted pitch disks for the sensing device is described in the published patent application DE 4,304,914 A1. Using a mounting device, the alignment of the axial and radial positions of the sensing device and of the pitch disk are achieved via a hub comprising a groove having specific tolerances and via corresponding receiving holes in the stator. In order to transmit this association of positions, the adjusted unit is fitted over the driving shaft, and the stator is then fixed, for example, on the flange of a motor, whereupon the hub, together with the pitch disk, is fixed on the driving shaft.

This solution also uses a complicated and expensive hub. This solution has the disadvantage of the considerable cumulative mechanical tolerances, which, on the one hand, require expensive manufacturing processes, and, on the other hand, the achievable tolerance of adjustment is very hard to achieve, in particular for high precision requirements. For example, the tolerances on fit between the internal hub diameter and the receiving shaft should be selected to be very narrow, so as to achieve small errors of eccentricity of the pitch on the pitch disk, which, however, complicates the process of mounting during fitting of the adjusted unit. Also, the fixing surface of the stator in its position relative to the driving shaft should be within narrow tolerances to avoid generating stresses between the stator and the pitch disk when fixing the stator, which stresses would lead to radial and axial displacements between the stator and the pitch upon release of the mounting device.

DE 3,740,477 A1 describes a method wherein the sensing head is fixed on a hub of an angle-measuring disk. A desired angle between the sensing head and the angle-measuring disk may be set accordingly.

These aforementioned solutions relate, above all, to the field of application of built-in rotation encoders.

In view thereof, it is the object of the invention to improve a method and an arrangement for mounting a sensing head of a gauge—preferably for rotational and linear measuring systems—of the aforementioned type such that inexpensive manufacture and easy and quick mounting in encoder systems or in the case of system integrations is possible.

SUMMARY OF THE INVENTION

In a method of the aforementioned type, this object is achieved in that the gauge or the sensing head is fixed on the first part in a gap-filling manner, in a position determined by positional fixation. The term "in a gap-filling manner" as used herein means any fixation of a component allowing to bridge a possibly existing gap between the contacting surfaces of said component and of a further component such that the components are fixed in position relative to each other.

Thus, the invention strives for that position of the sensing head relative to the gauge which is ideal for operation of the position measuring system, because only this position allows to achieve maximum precision of the results of measurement. Said ideal position is registered, and then the sensing head and the gauge are engaged with each other to lock their position. Next, either the sensing head or the gauge is fixed on the respective part in a conventional manner. In the prior art, a considerable effort is made to ensure that the parts can be fixed without the occurrence of tolerances. Deviations between the desired position and the actual position of the parts relative to the respective part have to be avoided in the prior art. If this is not possible, a more or less large gap is formed between the contacting surfaces of the part and the respective part to which it is to be fixed. In the prior art, said gap inevitably leads to an offset from the ideal position. The invention now takes an entirely different approach by no longer making an effort to avoid said gap. Instead, it provides a fixation which fixes the part to be fixed on the respective part and, in doing so, bridges the gap, which may now even be provided on purpose. Thus, upon release of the positional fixing between the sensing head and the gauge, the ideal position remains intact.

For an operating cooperation between the sensing head and the gauge, the exact position alignment of these two parts relative to each other is of great importance. The fixation according to the invention ensures that the sensing head remains in a position pre-adjusted relative to the gauge even after fixation on the second part.

In this connection, it is convenient to adjust the position of the sensing head relative to the gauge in a separate operation, before the sensing head is positionally fixed on the gauge, since this ensures a particularly exact alignment of the parts.

Moreover, it is beneficial to an exact function of the position measuring system, if the gauge is fixed on the first part in an exactly defined position. Therefore, it is advantageous if the position of the gauge relative to the first part is adjusted just before the gauge is fixed on the first part, so that the gauge can be specifically adjusted to the present first part during assembly of the position measuring system. This results in great flexibility for application, because a high degree of independence of tolerances or of the design of the first part is achieved during mounting of the gauge.

The adjusted position of the gauge relative to the sensing head should also be maintained during further mounting steps. Disadjustments are possible, if mechanical stresses act on the second part when fixing the sensing head. Said stresses are transmitted, via the sensing head, to the gauge and, from there, to the first part, and from the first part to the second part. Thus, stresses are also present in the fixation between the sensing head and the gauge, so that upon release of said fixation, the adjusted ideal position of both parts relative to each other would be lost. Therefore, in order to maintain the adjusted position in such cases, even upon release of the fixation between the sensing head and the gauge, a further advantageous embodiment of the invention provides for the sensing head or the gauge to be fixed on the respective part such that no stresses occur which might continue into the positional fixation between the gauge and the sensing head and which might cause displacement of both parts relative to each other upon release of the fixation. Thus, a fixation of this type is characterized in that it allows the part to be fixed in the position defined by the assembling operation so far.

In order to avoid stresses, it is therefore preferred to joint the sensing head or the gauge, or both, to the respective part. This type of fixation has the advantage that it does not limit the possibilities of arranging the parts to be connected.

Moreover, according to a further advantageous embodiment of the invention, a two-step jointing method may be provided. For this purpose, in a first jointing process, e.g. using a UV-curing construction adhesive at especially provided jointing points, quick fixation by adhesion may be carried out, and then, for example, by means of a slowly curing bicomponent adhesive, proper fixation by adhesion is carried out. However, since said fixing adhesion already provides sufficient mechanical stability, further mounting steps may eventually follow. This results in a shortened mounting time.

As an alternative to jointing, the sensing head may also be fixed by means of welding, soldering or screwing with interposition of clamping wedges which are displaceable relative to each other. These means of fixation allow the bridging of possible gaps between the contacting surfaces of the sensing head and of the second part. Moreover, welding or soldering allow filling of a gap.

There are various conceivable possibilities of fixing the sensing head to the gauge. These possibilities are required, above all, to achieve and maintain maximum precision. Said precision might be impaired because of undesired cumulative tolerances resulting from interposition of too many further parts. This danger is avoided by clamping the sensing head directly onto the pitch carrier.

Easy handling of the parts to be aligned with each other is required in order to achieve high precision of adjustment. The handling of the sensing head and of the gauge for and during adjustment may be simplified by initially effecting a rough pre-adjustment of the sensing head and fixing it on the pitch carrier with a clearance. Only thereafter is a fine adjustment effected between the sensing head and the gauge, upon completion of which the sensing head is finally clamped onto the pitch carrier.

The object underlying the invention is further achieved by a position measuring device of the aforementioned type, wherein the sensing head is releasably fixed in position on the pitch carrier. In this connection, it is envisaged that the sensing head be fixed directly on the pitch carrier. Directly means any arrangement which fixes the sensing head on the pitch carrier, and not to intermediate parts, which in turn carry the pitch carrier. In a surprisingly simple manner, this ensures that the predetermined position is maintained as exactly as possible. Moreover, this arrangement allows easy handling during mounting because of a small number of parts.

A parameter which has to be observed in order to achieve the predetermined position, is the distance between the sensing head and the gauge. Said distance may be manually adjusted, although auxiliary means are desirable for this purpose. Therefore, it is advantageous, if the sensing head is fixed directly on the pitch carrier with interposition of a spacer. Such a spacer may be provided in the fixing means of the sensing head on the pitch carrier, wherein said means is adapted to be fixable only in a specific position. For example, in the case of a screw connection, this may be realized by a stop up to which the fixing screw of the sensing head may be screwed into the pitch carrier, thus defining the distance. The spacer may also consist in an additional part which is mounted directly between the sensing head and the pitch carrier and which defines the desired distance by means of one of its dimensions, preferably its thickness. At the same time, said spacer may thus prevent undesired angles of pitch and yaw between the sensing head and the pitch carrier. As such spacers, plate-shaped or foil-shaped parts may be used on which there may be provided, in addition, auxiliary adjusting means for adjustment of the angular positions of the pitch structures relative to the sensing head and to the overlap of the pitch tracks with the sensing head.

In principle, the sensing head may be fixed on the pitch carrier by means of any releasable connection. Said connection is preferably such that the sensing head is fixed on the pitch carrier by friction engagement and/or form locking. For this purpose, use is preferably made of such devices which require little technical expenditure and which do not restrict the function and the use, above all, of the pitch carrier. Therefore, it is advantageous to clamp the sensing head onto the pitch carrier. This is because clamping does not require any devices on the pitch carrier which might impair its function.

The adjustment of the sensing head relative to the gauge all the more easily, and thus all the more precisely obtained, the more easily these two parts can be handled during adjustment. It may be easier if the sensing head and the gauge can initially be brought into a roughly preadjusted position, from which the adjustment is effected. Therefore, said fixation is preferably embodied such that it comprises an adjusting position, in which the predetermined position of the sensing head is adjustable relative to the pitch carrier, and a fixing position in which said positional fixing is effected.

The spacer is to be embodied such that it is suitable also for adjustment of the angular positions of the pitch structures relative to the sensing head. For this purpose, the spacer itself has to be brought into an immobilized position, which may be effected by means of a fixing means adapted to this end. However, since the spacer is, in most cases, removed again after adjustment, it should be fixable with as little effort as possible. This may be done by screwing or, ideally, by clamping between the sensing head and the pitch carrier. In doing so, however, the spacer may be inadvertently moved from the intended position. Therefore, it is advantageous, if the spacer is protected against torsion and/or displacement. For securing, use may be made, for example, of stops which prevent a change in the position of the spacer, or of bolts or pins engaging in depressions or openings in the spacer.

The adjustment of the predetermined position requires auxiliary means by which this position is defined. Such auxiliary means may be templates or gauges. However, it is desirable to require as few tools as possible for adjustment of the predetermined position. Therefore, it is advantageous, if the gauge comprises adjusting structures for adjustment of the predetermined position. This allows particularly high precision as to the predetermined position, because it is individually defined for each gauge and cannot be degraded by damaged tools or gauges.

If the gauge is already provided with adjusting structures, it is advantageous, if the sensing head carries corresponding structures. Therefore, according to an advantageous embodiment of the invention, the sensing head comprises companion marks for the adjusting structures of the gauge. This allows a higher precision of adjustment to be achieved.

For the manufacture of the pitch carrier, any material resisting conventional stresses of a measuring instrument is suitable. Moreover, it should enable adjusting structures on the pitch carrier. In many cases, depending on the position in which the pitch carrier is built in, these are required on a side of the pitch carrier facing away from a mechanic, so that establishment of the predetermined position is, at least, made a little harder. Therefore, according to a preferred embodiment of the invention, the pitch carrier is at least partially transparent, namely at least in the region of the adjusting structures. This enables reading the adjusting structures from both sides and independently of the position in which the pitch carrier is built in.

The gauge must be designed such that it may be fixed on and adjusted on the first part. For this purpose, it has to be adaptable to different dimensions of the first part. A number of gauges may be provided for this purpose, differing in one essential dimension which corresponds to one dimension of the first part—for example, the diameter of the hub and of the axis. However, according to an advantageous embodiment of the invention, the gauge comprises a pitch carrier and a hub, said pitch carrier being disk-shaped and having a centrally located recess whose smallest dimension is greater than the diameter of the hub, and said pitch carrier being fixed on the hub. The gauge is then fixed by initially fixing a hub on the first part, said hub being adapted to the dimensions of the first part. Next, the pitch carrier, which may be designed largely independently of the dimensions or of the design of the first part, is fixed on the hub via a flange, with the clearance between the hub and the recess enabling adjustment. This substantially simplifies the manufacture of the gauge, because fabrication of the pitch carrier, which is complicated and expensive due to the pitch structures, may be carried out regardless of the dimensions and shape of the first part. In contrast thereto, adjustment of the first part is effected via the relatively easy-to-produce hub.

In a method of the aforementioned type, the sensing head, with its sensing structures, is aligned with the pitch structures on the pitch carrier in all required coordinates and fixed, in this condition, on the pitch carrier by means of special fixing elements in an easily releasable manner. Thereafter, the pitch carrier with the sensing head fixed thereto is adjusted on and fixed on the envisaged machine part in its envisaged measuring position, and then the sensing head is fixed on the second machine part, in this position and without any stresses, and it is only then that the fixing elements between the sensing head and the pitch carrier are removed or released.

By surprisingly simple means, the method of the invention ensures that very easy and quick mounting of these measuring components may be realized, in a manner appropriate to the application, after the sensing head has been adjusted to the pitch structures and fixed on the pitch carrier. This method achieves a favourable division of labour between the pre-assembly, which depends greatly on the measuring system, and very simple mounting of these components, which depends on the application. This is particularly advantageous, because the pre-assembly, which depends on the measuring system, can be carried out independently of the final use by means of special devices and also in a highly automated manner.

This method is of particular advantage for optical position measuring systems, in particular for the measurement of lengths and angles. Depending on the period of the pitch on the pitch carrier, optical sensing of pitches on the pitch carrier requires that the sensing structure, which is usually arranged on a sensing plate, be adjusted to the pitch within more or less narrow tolerances. In this connection, the distance, the angular positions and the overlap of individual pitch marks are important parameters of adjustment. The optical and, thus, ultimately also the electrical signal qualities are considerably deteriorated by deviations of the distances and angular positions from the desired values. According to the invention, the distance and the angular positions between the sensing structure and the pitch structure are adjusted by means of special spacers.

An advantageous solution for the spacers for adjustment of the desired distance between the sensing structure and the pitch structure may be achieved by the use of a distancing sheet of a thickness corresponding to the desired distance, said sheet being placed between the pitch carrier and the sensing plate. Thus, using a parallel sheet, the angles of pitch and yaw of the sensing plate relative to the pitch carrier are also optimally adjusted at the same time.

It is particularly advantageous to use an optically transparent sheet as a distancing sheet, through which the overlap and the rotation of the sensing structure relative to the pitch structure may be observed and, thus, also adjusted. Since the optical path between the sensing structure and the pitch structure is falsified by the use of transparent sheets in the optical beam path, it is particularly advantageous, above all, in the case of small periods of the pitch, if the distancing sheet has a recess in the region of the optical beam path.

In the case of very sensitive sensing structures and pitch structures, the distance and the parallelism between the pitch carrier and the sensing plate may also be adjusted by specially shaped spacers, which contact the pitch carrier and/or the sensing plate only in areas outside of the sensitive structures.

After the sensing structures and the pitch structures have been adjusted relative to each other, the sensing head is fixed in its position relative to the pitch carrier. Advantageously, said position fixing is effected by clamping elements which urge the sensing head and its sensing plate against the pitch carrier, in its optimal functional position, via the spacer. The application of force of the clamping elements for urging the sensing head should advantageously take place on the rear surface of the pitch carrier, i.e. on its side opposite the pitch structures. In order to achieve secure position fixing between the sensing head and the pitch carrier with minimal application of force, it is particularly advantageous, if the clamping at the point of contact between the clamping elements and the pitch carrier is such that two materials of high coefficient of static friction are obtained. In contrast thereto, the point of contacts between the spacer and the pitch carrier and between the spacer and the sensing plate should be designed such that they have a minimal coefficient of friction, so as to enable simple removal thereof at a later stage.

An advantageous embodiment of the clamping elements consists in that the clamping only produces components of force which are perpendicular to the pitch carrier and that possibly occurring transverse forces and torques are avoided. This may be effected by specially designed pressure elements, which are protected against torsion relative to the sensing head and comprise special mechanisms for parallel or almost parallel guiding. The clamping force may be produced via known means, such as screw mechanisms, eccentric mechanisms or wedge mechanisms.

Depending on the design and in view of costs, the clamping elements may be embodied as an integral part of the sensing head or as removable and reusable parts.

An advantageous embodiment of the invention also consists in that the clamping elements are directly integrated in the sensing head such that pressure elements, advantageously in the form of screws, are provided via a U-shaped design of the sensing head relative to the sensing plate. The sensing head is then fixed such that, after adjustment of the sensing structure relative to the pitch structure, the sensing head is securely clamped to the pitch carrier, in a manner secured against displacement, by means of the pressure screws, advantageously via an intermediate element, which accommodates the torque and transverse force components of the pressure screws, and via the spacer on the side of the pitch structure and the intermediate element on the rear surface.

Then, in a first process step, for actually mounting the measuring system components in the encoder or on the measuring lens, only the pitch carrier is to be adjusted in its required functional position on the first relatively movable part using the two relatively movable parts. In doing so, the sensing head still remains in its fixed position relative to the pitch carrier. This adjustment is effected according to known process steps, for example, via centering marks or self-centering devices on the pitch carrier. After adjustment, the pitch carrier is then fixed on said part. Since the sensing head is still in the ideal functional position relative to the pitch carrier, it may be fixed on the second part while it is still in this rigid position relative to the pitch carrier.

During this fixation, no notable compelling forces should be transmitted to the pitch carrier. In a very advantageous manner, said fixation may be effected by thin-gap jointing. That is, the tolerances of design are selected so as to inevitably produce a small air gap between the sensing head and the second part. For example, said air gap may be some few tenths of a millimeter wide. Preferably, said air gap is then filled with known adhesives exhibiting little shrinkage, and the sensing head is fixed on the second part. For secure and easy adhesion, the specific design of the adhering surfaces may be conceivable in advantageous embodiments such as roughened surfaces, capillaries for adhesive, pockets for adhesive and other measures.

For safe functioning of the measuring system over wide temperature ranges, the use of an adhesive which is adapted in terms of the expansion coefficient may be advantageous.

After the sensing head has then been fixed on the second part, as free from mechanical stresses as possible, the fixation between the sensing head and the pitch carrier should be released according to the method of the invention. Depending on the selected design of the spacer and of the fixing elements, these should then be removed or brought into a position which does not interfere with the function of the measuring system.

Using these simple process steps, on the one hand, very easy mounting of the measuring system components in the object to be measured is achieved, because separate mounting of the sensing head and of the pitch carrier is very time-consuming and complicated, especially for optoelectronically unexperienced mechanical personnel. On the other hand, this method also allows to achieve a clear reduction of mechanical tolerances of shape and position on the fixing part of the sensing head, since said tolerances are compensated for, in large areas, by gap jointing.

DESCRIPTION OF THE FIGURES

The invention is explained in more detail below, essentially by way of example, with reference to drawings, wherein:

FIGS. 11–13 show schematic views of the steps for mounting the pre-adjusted linear measuring system into a positioning unit.

DETAILED DESCRIPTION OF THE PREFERRED EMBODIMENTS

Figure 1:
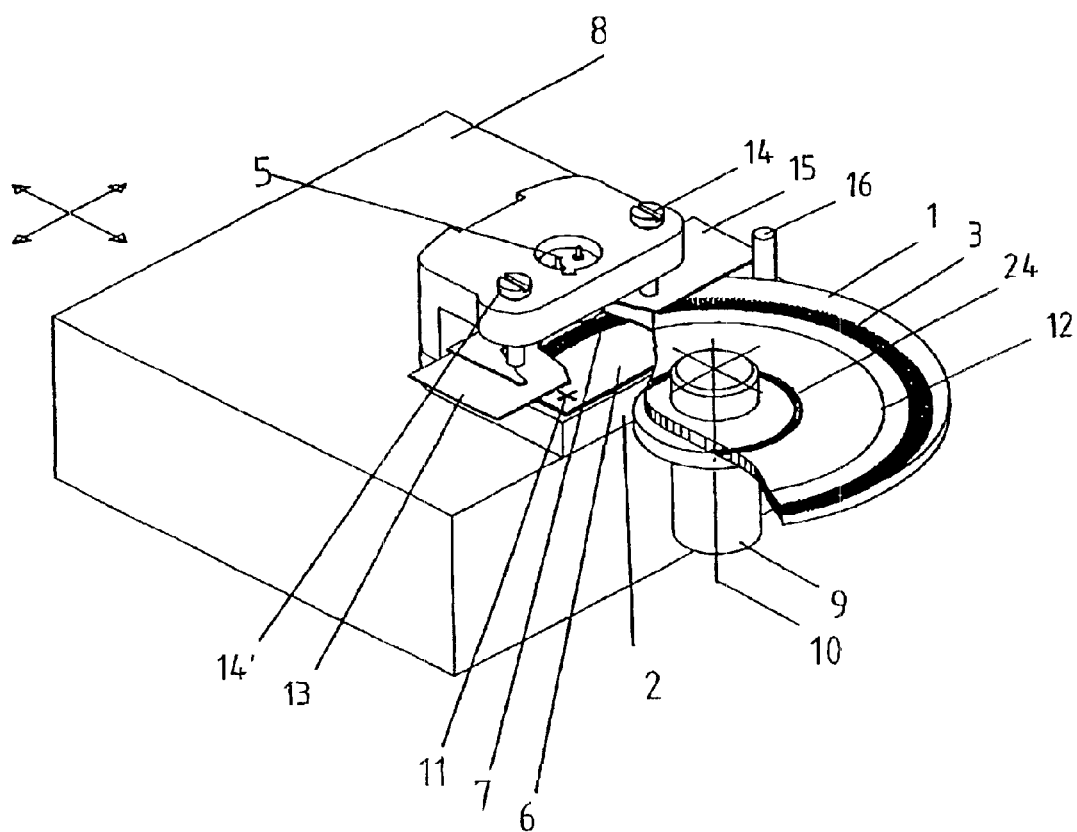
FIG. 1 shows a schematic view of the pre-adjustment of the components for an optical angle-measuring device.

FIG. 1 (schematically) shows an optical measuring device designed for pre-adjusted mounting, as far as it is required to illustrate the method. Said optical angle-measuring device consists of a pitch disk 1 as a gauge and of a sensing head 2, which senses the pitch structures 3 on the transparent pitch disk 2 according to the transmitted light method in a known manner. The pitch structures 3 are provided as pitches. The sensing head 2 comprises an illuminating unit 5 and a sensing plate 6 having sensing structures 7 thereon, which correspond, in a known manner, to the pitch structures 3 to be sensed. The resulting optical sensing signals are transformed into electrical signals in a conventional and, thus, not represented manner, via photodiodes and further electrical components, said electrical signals being transmitted to a control unit or a counter via electrical lines.

The sensing head 2, in particular the sensing plate 6 with the sensing structures 7, must be very precisely aligned with the pitch structures 3. The sensing structures 7 must be aligned both in the radial direction and in their orientation relative to the pitch structures 3.

For this purpose, the pitch disk 1 is advantageously fixed in a special mounting device 8. Particularly advantageously, the pitch disk 1 is fixed such that the pitch structures 3 are centered relative to a receiving axis 9. Said receiving axis 9 serves as a radial reference point 10 (origin of coordinates).

Figure 2:
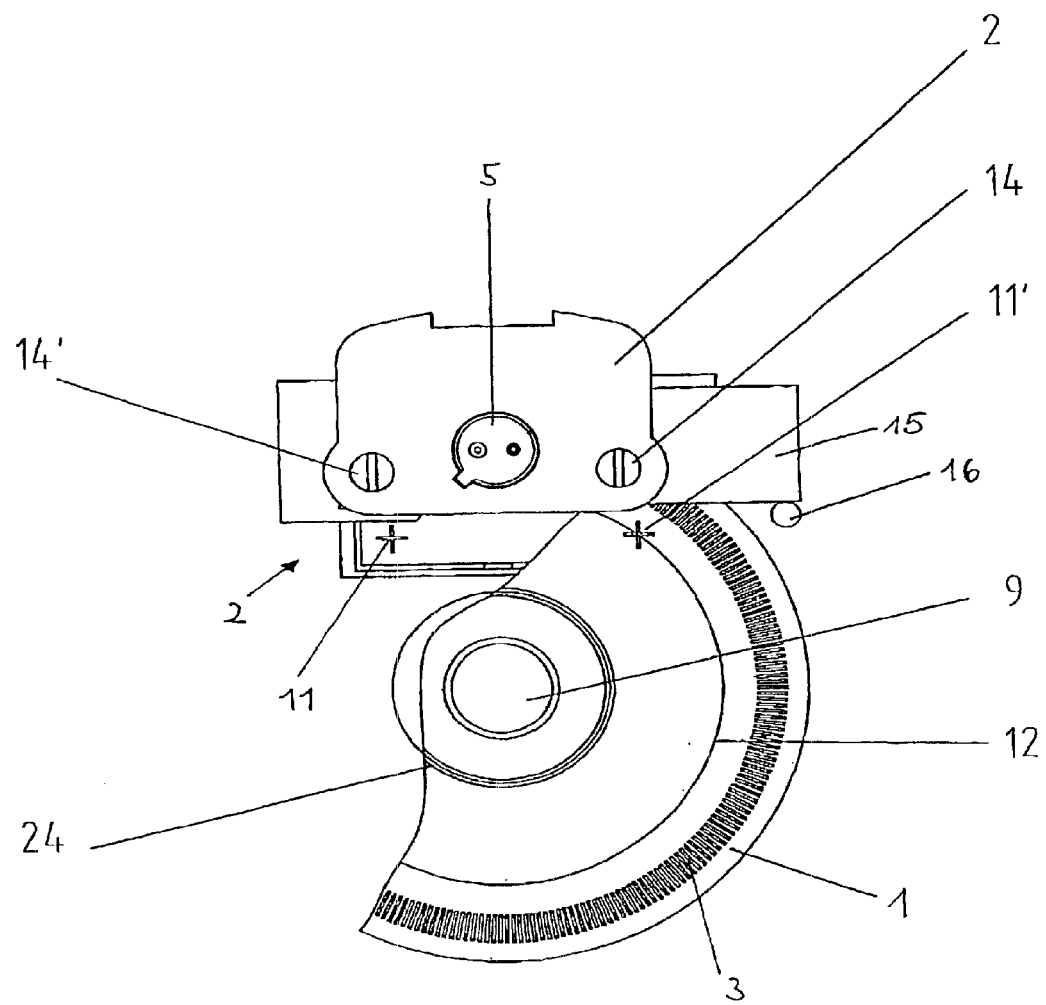
FIG. 2 shows a top view of a pre-adjusted angle-measuring device.

The sensing structures 7 are then aligned to the pitch structures 3 via special adjusting marks 11 and 11' on the sensing plate which are made to overlap with a special adjusting circle 12 on the pitch disk (cf. FIG. 2). Said overlap may usually be observed using a telecentric microscope (not shown). Since, in particular, very fine sensing structures require a very exact alignment, said alignment is advantageously carried out by means of a manipulator (not shown) having several degrees of freedom 4.

Further, in order to generate optical signals, the distance between the sensing structures 7 and the pitch structures 3 is also of great importance. According to known laws, there are optimal distances for the different sensing structures. Further, the plane of the sensing structures 7 should be arranged parallel to the plane of the pitch structures 3. This adjustment is advantageously carried out by means of a spacer 13 in the form of a sheet whose thickness corresponds to the optimal distance. For this purpose, the sheet is placed between the pitch disk 1, on the side of the pitch structures 3, and the sensing structures 7 of the sensing plate 6 and contacted on both sides. For this purpose, the sensing plate 6 should advantageously protrude slightly from the sensing head 2. Thus, the plane parallel spacer 13 with a thickness corresponding to the desired distance easily enables both the optimal distance of the optical structures (axial adjustment) and the parallel arrangement of the pitch disk 1 relative to the sensing plate 6.

In this adjusted position of the sensing head 2 relative to the pitch disk 1, the sensing head 2 is then fixed, relative to the pitch disc 1, by means of special clamping elements 14. In this embodiment, said clamping elements 14 are provided as pressure screws.

Figure 3:
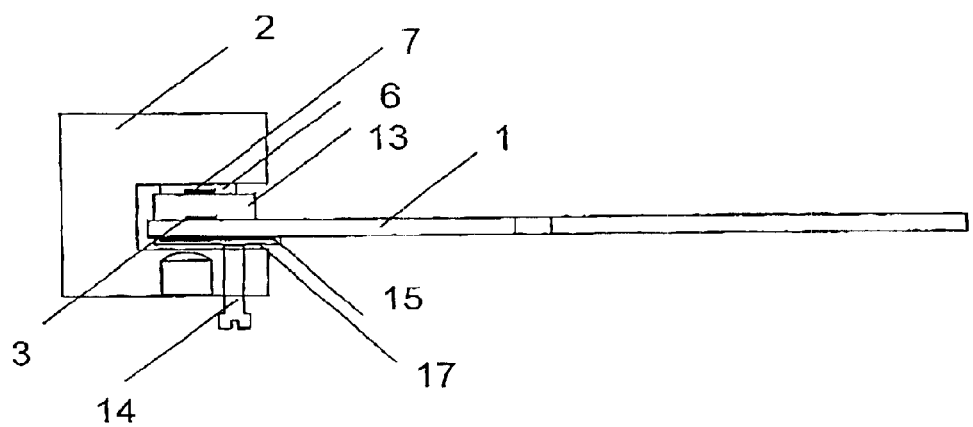
FIG. 3 shows a cross-sectional view of the pre-adjusted angle-measuring device in a position turned around relative to FIG. 1.

Use is advantageously made of an intermediate plate 15, which, if possible, is protected against torsion, so as to avoid damage to the pitch disk 1, on the one hand, and to absorb the usual screwing torques, on the other hand. Said protection of this intermediate plate 15 against torsion is achieved by a special lock 16 thereof relative to the mounting device 8. For good fixation, i.e. for clamping in a manner protected against sliding, the intermediate plate 15 is coated with a thin, elastic, slide-proof layer 17 on the side contacting the pitch disk 1 (cf. FIG. 3).

Upon fixing of the sensing head 2 on the pitch disk 1, the pre-adjusted measuring system unit is removed from the mounting device 8 and becomes available for an advantageous assembly of the measuring system for the most diverse applications.

Figure 4:
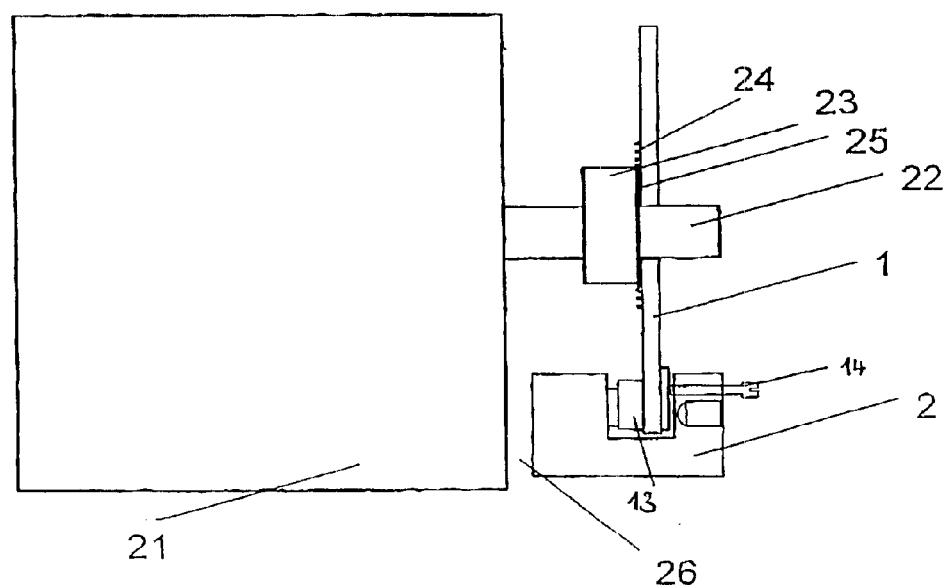
FIGS. 4–6 show schematic views of the mounting steps for mounting the pre-adjusted angle-measuring device into an electric motor.
Figure 5:
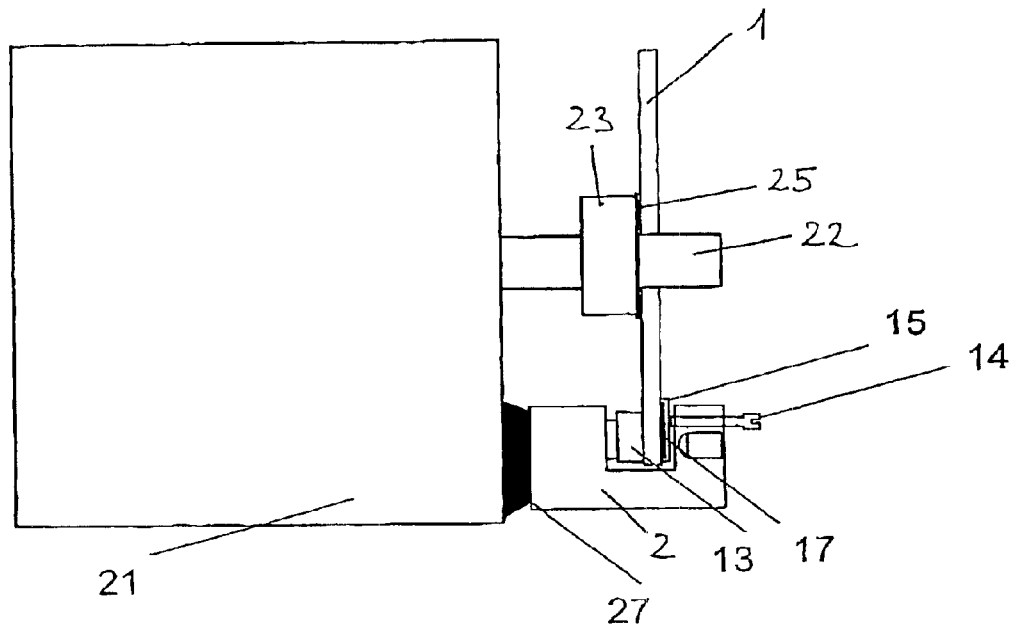
Figure 6:
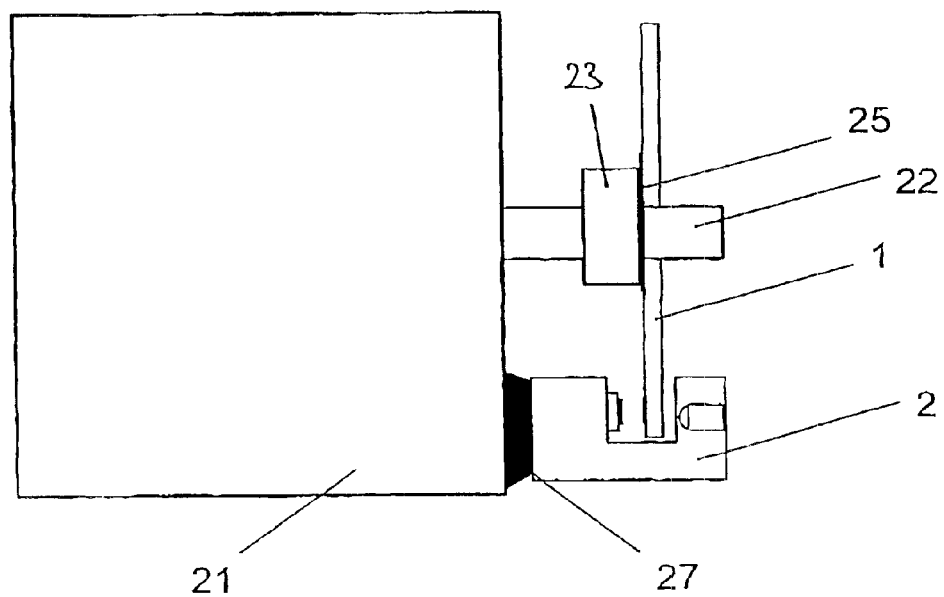

FIGS. 4 to 6 show the steps of the method according to the invention for mounting of a pre-adjusted angle-measuring device on an electric motor 21. Using this angle-measuring device —also referred to as rotary encoder—the rotary movements of the driving shaft 22 are to be measured.

FIG. 4 shows the first process step, wherein the pitch disk 1 is centered and fixed. In order to mount the rotary encoder system, the pitch disk 1 with the sensing head 2 fixed thereto is first applied to the supporting flange 23 of the driving shaft 22 and centered. For easy centering of the pitch disk 1 relative to the driving shaft 22 and, thus, also to the supporting flange, there are several adjusting circles 24 provided on the pitch disk, concentrically to the pitch structures, said adjusting circles 24 having a thickness of 10 $\mu$m and being spaced apart by 10 $\mu$m each (cf. FIG. 2). The supporting flange 23 has a desired diameter of 16 mm, and the diameters of the concentric adjusting circles 24 range from 15.900 mm to 16.100 mm. In a very easy manner, this arrangement allows the outer diameter of the supporting flange 23 to be made to overlap with one of the adjusting circles 24 by means of symmetrization, without having to rotate the pitch disk 1 for this purpose. The adjusting circles 24 on the pitch disk 1 being arranged concentrically to the pitch structures 3 allow easy centering of the pitch disk 1.

Then, the pitch disk 1 is jointed to the supporting flange 23 using known, commercially available adhesives. If the joint is sufficiently secure, the fixed sensing head 2 is positioned, if required, above its built-in position by rotation of the motor driving shaft. The position of the applying shaft 23 in the axial direction is of such constructive dimension that an air gap 26 of 0.2 +/−0.1 mm is formed between the bottom surface of the sensing head, which was especially provided as a jointing surface.

FIG. 5 shows the fixation of the sensing head on the stator of the motor. For this purpose, the air gap 26 is filled with a fiberglass-filled epoxide resin adhesive according to known jointing techniques This adhesive was dimensioned such that it cures with little shrinkage and free of stress. For improved adhesion, the jointing surface on the sensing head 2 was provided with special pockets for adhesive, not shown, and a rough surface was provided.

To shorten the time required for assembly, said adhesion may also be effected in two steps. For this purpose, in a first adhesive process, using a UV-curing construction adhesive at especially provided adhesive points, quick fixation by adhesion may be carried out, and then the proper fixation by adhesion is carried out by means of a slowly curing bicomponent adhesive. However, since said fixing adhesion already provides sufficient mechanical stability, the fixation of the sensing head 2 on the pitch disk 1 may be detached already at this point. For this purpose, first the fixing screws 14 are removed, and then the intermediate plate 15 and the spacer 13.

FIG. 6 shows the fully assembled angle measuring device on the electric motor. Upon establishing the electrical connections to the electric evaluation unit, not shown, the rotary optical encoder is fully operable without having to effect any further electrical or mechanical adjustments.

Figure 7:
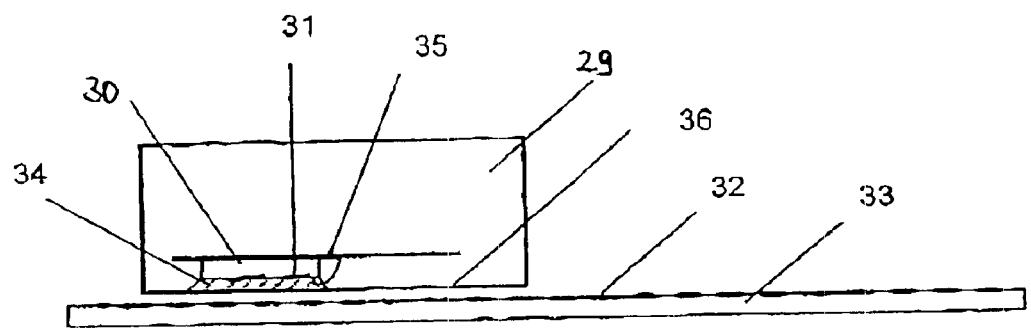
FIG. 7 shows a rule and a sensing head of a magnetoresistive linear measuring system.
Figure 8:
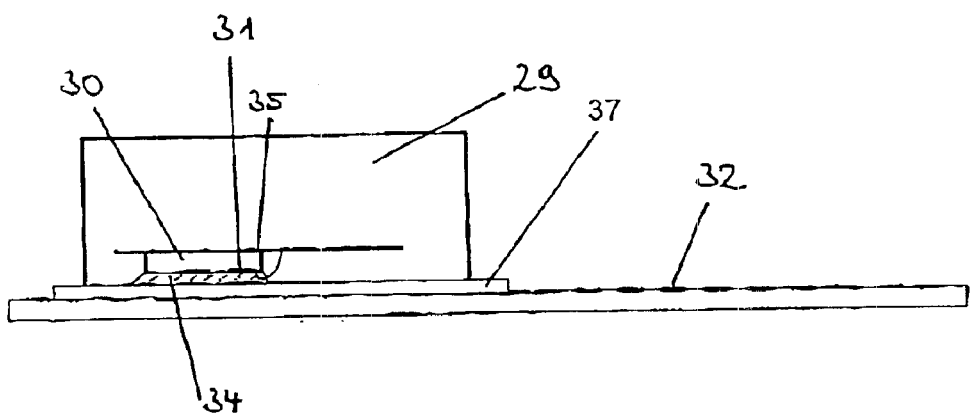
FIGS. 8–10 show views of the pre-adjusted sensing head relative to the rule.
Figure 9:
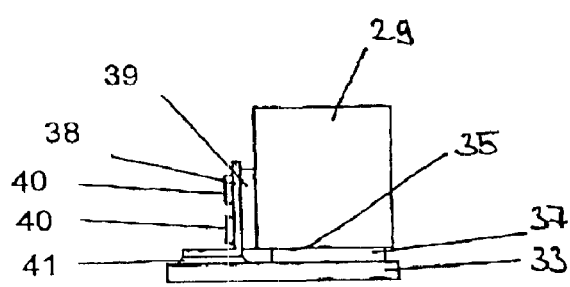
Figure 10:
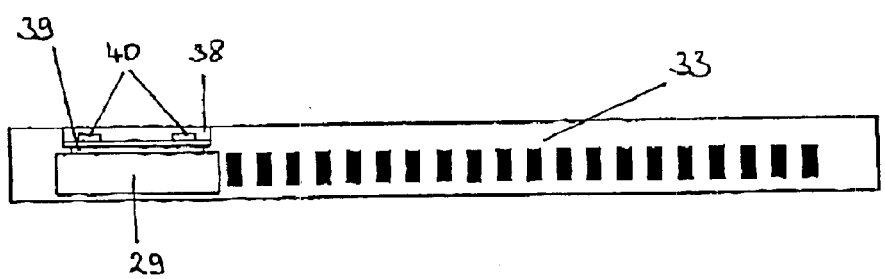

FIGS. 7 to 9 show a further embodiment example of the steps of the method according to the invention for linear encoders. By way of example, the mounting technology for magnetoresistive position measurement by means of a pre-adjusted sensing head will be shown herein.

FIG. 7 schematically shows the measuring system components. The sensing head 29 comprises a special receiver chip 30. The receiver chip 30 contains receiver structures 31, which correspond to the magnetic pitch structures 32 on the magnetic rule 33. A thin parallel cover layer 34 is molded on the receiver chip 30. The receiver chip 30, together with the molded layer 34, corresponds to the sensing plate 6 of FIG. 1. In this specific embodiment, the receiver chip 30, which is bonded to a wiring board 35, is arranged in the sensing head housing such that the receiver chip 30 and its sensing structures are located 100 mm below the housing edges 36. The molded layer 34 is flush with the housing edges and, thus, the lower housing edges 36 are also level with the sensing plate 6.

The magnetic rule 33 consists of a fiberglass-filled polyamide on which the magnetic pitch structures are printed as a pitch having a period of pitch of 1 mm. An optimal distance for this period of pitch is 500 $\mu$m between the pitch and the sensing structures. This results in an optimum working distance of 400 $\mu$m between the sensing head and the ruler.

According to the invention, this working distance is set by means of a special spacer 37. For this purpose, the sensing head 29 is geometrically aligned with the pitch. Using a manipulator, not shown, the sensing head is positioned such that a maximum output signal is obtained in an electric evaluation circuit (not shown). Since the envisaged application requires the magnetic rule 33 to be jointed along its entire surface, the fixation of the sensing head 29 is effected via an auxiliary square 38. For this purpose, the sensing head 29 is adjusted in its distance to the magnetic rule 33 via the spacer 37, which is held in its optimum position by the manipulator. An auxiliary square 38 is screwed onto a distance piece 39 by means of the screws 40, such that the second leg of the auxiliary square 38 contacts the magnetic rule 33. Said second leg is then jointed to the magnetic rule 33 by means of a commercially available thin-gap adhesive 41. Upon solidification of the joint, the magnetic rule 33 with the fixed sensing head 29 can be removed from the adjusting device. This pre-adjusted measuring system is then ready for efficient mounting on site. Said assembly is then effected such that the magnetic rule 33 is aligned, along its lengthwise extension, with the machine run and jointed to the machine bench.

FIG. 11 shows a positioning unit, consisting of a basis 41 and a positioning table 42, which is displaceable on the guide. The pre-adjusted measuring system, as shown in FIG. 12, is aligned with the run of the positioning table 42 along the lengthwise extension of the rule 33 and jointed by means of an elastic adhesive. As the magnetic rule 33 possesses sufficient positional stability, the sensing head 29 is fixed on the positioning table 42 by means of a thick-gap joint 43. Once said joint has cured, the sensing head 29 can be detached from auxiliary square 38. For this purpose, the fixation of the sensing head 29 to the rule 33 is released via the auxiliary square 38 and the distance piece 39 is removed. FIG. 13 shows the fully assembled measuring device.

Further, use may be made of the following when fixing the position measuring device:
pockets for adhesive;
stationary position of the head relative to the pitch (reference point-zero point);
special spacers;
special designs of pressure holders;
adjusting marks on a sensing plate;
adjustment of the sensing head to the pitch structure by measurement using a manipulator in all coordinates with Offset R1 and A1 outside, followed by insertion of the spacer, displacement using the manipulator R1 and A1 and, then, fixation of the sensing head.

Although the description above contains many specificities, these should not be construed as limiting the scope of the invention but as merely providing illustrations of some of the presently preferred embodiments of the invention. Thus, the scope of the invention should be determined by the appended claims and their legal equivalents, rather than by the examples given.

We claim:

1. A method for mounting a position measuring system on a first part and on a second part movable relative to said first part, wherein said position measuring system comprises a gauge, which has a pitch carrier and is fixable on said first part, said a sensing head fixable on said second part, said method comprising the steps of:
    a) fixing the sensing head on the gauge such that the sensing head and the gauge are fixed in position relative to each other, wherein a removable spacer is interposed between the sensing head and the pitch carrier;
    b) fixing the gauge on the first part and the sensing head on the second part; and
    c) releasing said fixation between the sensing head and the gauge,
    wherein the sensing head or the gauge is fixed on the respective part, in the position defined by said positional fixation, in a gap-filling manner, and wherein the spacer is removed to provide a predefined clearance between the sensing head and the pitch carrier.

2. The method as claimed in claim 1, wherein the position of the sensing head relative to the gauge is adjusted before the sensing head is positionally fixed on the gauge in step a).

3. The method as claimed in claim 2, characterized in that the sensing head, roughly pre-adjusted, is initially fixed on the pitch carrier with a clearance and then fine-adjusted to the pitch carrier and clamped onto the pitch carrier in this position in a position-fixing manner.

4. The method as claimed in claim 1, wherein the position of the gauge relative to the first part is adjusted before the gauge is fixed on the first purt in step b).

5. The method as claimed in claim 1, wherein the sensing head or the gauge is fixed on the respective part, in step b), such that no stresses are created.

6. The method as claimed in claim 1, wherein at least one of the gauge and the sensing head are jointed to the respective part.

7. The method as claimed in claim 6, characterized by a two-step jointing method.

8. The method as claimed in claim 6, wherein the sensing head and the gauge is fixed on the respective first or second part, in step b), by one of welding, soldering or by screwing with interposition of clamping parts which are displaceable relative to each other.

9. The method as claimed in claim 1, characterized in that the sensing head is fixed on the gauge, in step a), by being clamped onto the pitch carrier.

10. A position measuring system for sensing a movement between a first part and a second part, which is movable relative to the first part, wherein the position measuring system is suitable, in particular, for the method of assembly as claimed in claim 1, and wherein the position measuring system comprises:

- a gauge, which is fixable on the first part and comprises a pitch carrier,
- a sensing head which is fixable on the first part and senses a movement of the gauge relative to the sensing head,
- a fixation by which said gauge and said sensing head can be fixed in a predetermined position relative to each other, and
- wherein the sensing head is releasably fixed in position on the pitch carrier with interposition of a removable spacer which provides for a clearance between the sensing head and the pitch carrier when removed.

11. The position measuring system as claimed in claim 10, characterized in that the sensing head is fixed on the pitch carrier by one of friction engagement and form locking.

12. The position measuring system as claimed in claim 11, characterized in that said fixation comprises an adjusting position, in which the predetermined position of the sensing head is adjustable relative to the pitch carrier, and a fixing position in which said positional fixing is effected.

13. The position measuring system as claimed in claim 10, characterized in that the sensing head is clamped onto the pitch carrier.

14. The position measuring system as claimed in claim 10, characterized in that the spacer is secured against at least one of rotation and displacement.

15. The position measuring system as claimed in claim 10, characterized in that the gauge comprises adjusting structures for adjustment of the predetermined position.

16. The position measuring system as claimed in claim 15, characterized in that the sensing head comprises companion marks for the adjusting structures of the gauge.

17. The position measuring system as claimed in claim 15, characterized in that the pitch carrier is at least partially transparent.

18. The position measuring system as claimed in claim 10, characterized in that the gauge comprises the pitch carrier and a hub, said pitch carrier being disk-shaped and having a centrally located recess whose smallest dimension is greater than the diameter of the hub, end said pitch carrier being fixed on the hub.

19. A position measuring system for sensing a movement between a first part and a second part, which is movable relative to the first part, wherein the position measuring system is suitable, in particular, for the method of assembly as claimed in claim 1, and wherein the position measuring system comprises:

- a gauge, which is adjustably fixable on the first part and comprises a pitch carrier,
- a sensing head which is fixable on the first part and senses a movement of the gauge relative to the sensing head,
- a fixation by which said gauge and said sensing head can be fixed in a predetermined position relative to each other, and
- wherein the sensing head is releasably and adjustably fixed in position on the pitch carrier with interposition of a removable spacer which provides for a clearance between the sensing head and the pitch carrier when removed.

* * * * *